US009856989B2

(12) United States Patent
Lenzi et al.

(10) Patent No.: US 9,856,989 B2
(45) Date of Patent: Jan. 2, 2018

(54) METHOD FOR PRODUCING A VALVE BODY FOR AN ELECTROMECHANICALLY OPERABLE VALVE, A VALVE BODY, AND AN ELECTROMECHANICALLY OPERABLE VALVE COMPRISING THE VALVE BODY

(71) Applicant: Continental Automotive GmbH, Hannover (DE)

(72) Inventors: Francesco Lenzi, Leghorn (IT); Stefano Filippi, Castel' Anselmo Collesalvetti (IT); Mauro Grandi, Leghorn (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 160 days.

(21) Appl. No.: 14/293,413

(22) Filed: Jun. 2, 2014

(65) Prior Publication Data
US 2015/0034850 A1 Feb. 5, 2015

(30) Foreign Application Priority Data

Aug. 2, 2013 (EP) ..................................... 13179138

(51) Int. Cl.
*F16K 27/00* (2006.01)
*C21D 1/34* (2006.01)
(Continued)

(52) U.S. Cl.
CPC ................ *F16K 27/00* (2013.01); *C21D 1/34* (2013.01); *C21D 9/00* (2013.01); *F02M 51/061* (2013.01);
(Continued)

(58) Field of Classification Search
CPC ....... F16K 27/00; F16K 31/06; F02M 51/061; F02M 51/0671; F02M 2200/80;
(Continued)

(56) References Cited

U.S. PATENT DOCUMENTS 5,944,262 A  8/1999  Akutagawa et al. ...... 239/585.4
6,498,416 B1 *  12/2002  Oishi ................. F02M 51/0614
                                                   310/214
(Continued)

FOREIGN PATENT DOCUMENTS

CN  1989337 A  6/2007  ............. F02M 51/06
EP  1878908 A2  1/2008  ............... H01F 7/08
(Continued)

OTHER PUBLICATIONS

European Search Report and Written Opinion, Application No. 13179138.6, 5 pages, dated Dec. 12, 2013.
(Continued)

*Primary Examiner* — Marina Tietjen
*Assistant Examiner* — Daphne M Barry
(74) *Attorney, Agent, or Firm* — Slayden Grubert Beard PLLC

(57) ABSTRACT

A valve body for an electromechanically operable valve is produced by providing a base element with a circumferential sidewall having a first portion, a second portion, and a third portion, the sidewall being made of a ferromagnetic material and enclosing a cavity extending along a longitudinal axis. The third portion is positioned in longitudinal direction between the first portion and the second portion. A thickness of the third portion is smaller than a thickness of the first portion and the second portion. Hardening the third portion is achieved by laser heating, which transforms a material structure of the third portion into a martensitic structure. The locally decreased thickness creates a bottleneck for a magnetic flux, and a magnetic flux bypass in the valve body is reduced due to magnetic saturation; however, a structural resistance of the valve body remains high due to the laser induced hardening.

8 Claims, 2 Drawing Sheets

(51) Int. Cl.
  *F02M 51/06* (2006.01)
  *F16K 31/06* (2006.01)
  *C21D 9/00* (2006.01)

(52) U.S. Cl.
  CPC .......... *F02M 51/0671* (2013.01); *F16K 31/06* (2013.01); *C21D 2211/008* (2013.01); *F02M 2200/80* (2013.01); *F02M 2200/9061* (2013.01); *F02M 2200/9069* (2013.01)

(58) Field of Classification Search
  CPC ..... F02M 2200/9069; F02M 2211/008; F02M 2211/9061; C21D 9/00; C21D 1/34; C21D 2211/008
  USPC .................. 251/129.15, 368; 148/120, 121
  See application file for complete search history.

(56) References Cited

U.S. PATENT DOCUMENTS

| | | | |
|---|---|---|---|
| 6,749,137 B2 * | 6/2004 | Kato | F02M 51/0614 239/533.11 |
| 7,617,805 B2 * | 11/2009 | Highum | B22D 19/0081 123/193.2 |
| 7,758,707 B2 * | 7/2010 | Millward | C21D 1/18 148/325 |
| 8,245,394 B2 | 8/2012 | Seitter et al. | 29/851 |
| 2011/0186769 A1 * | 8/2011 | Mizobe | H01F 7/081 251/368 |

FOREIGN PATENT DOCUMENTS

| | | | |
|---|---|---|---|
| GB | 2262659 A | 6/1993 | ............. F02M 51/06 |
| JP | 10318079 A | 12/1998 | ............. F02M 51/06 |

OTHER PUBLICATIONS

Chinese Office Action, Application No. 201410375521.5, 13 pages, dated Jun. 23, 2017.

* cited by examiner

METHOD FOR PRODUCING A VALVE BODY FOR AN ELECTROMECHANICALLY OPERABLE VALVE, A VALVE BODY, AND AN ELECTROMECHANICALLY OPERABLE VALVE COMPRISING THE VALVE BODY

CROSS-REFERENCE TO RELATED APPLICATIONS

This application claims priority to EP Patent Application No. 13179138 filed Aug. 2, 2013. The contents of which are incorporated herein by reference in their entirety.

TECHNICAL FIELD

The present disclosure relates to a method for producing a valve body for an electromechanically operable valve, a valve body, and an electromechanically operable valve for an internal combustion engine which comprises the valve body.

BACKGROUND

Injectors for internal combustion engines usually comprise a valve body which must be resistant to the pressures within the injector and, at the same time, capable of guiding a magnetic flux created by a coil of the injector. The valve body itself is typically ferromagnetic which causes the problem that a magnetic flux bypass through the ferromagnetic valve body wall is created. Such a magnetic flux bypass causes a general worsening of injector dynamic responses.

In order to overcome this disadvantage, paramagnetic valve bodies which shield impervious the magnetic flux have been applied in injectors. These paramagnetic valve bodies reduce the overall efficiency of a magnetic circuit of the injector and worsen any injector dynamic response due to a big radial gap between armature and housing as well as washer and housing.

Another possible solution for overcoming said disadvantage is described in document GB 2 262 659 A in which a non-magnetic portion is positioned between two magnetic portions of the valve body. Although such a solution reduces the magnetic flux bypass, mechanical properties, and—as a result—the resistance to pressure is reduced as well.

SUMMARY

One embodiment provides a method for producing a valve body for an electromechanically operable valve, comprising the steps: (a) providing a base element with a circumferential side wall made of a ferromagnetic material and enclosing a cavity extending along a longitudinal axis, wherein the sidewall has a first portion, a second portion, and a third portion, the third portion being positioned in longitudinal direction between the first portion and the second portion, wherein a thickness of the third portion is smaller than a thickness of the first portion and the second portion, and (b) hardening the third portion by laser heating, wherein the ferromagnetic material is warmed up to a desired temperature and the laser is moved across the third portion once the desired temperature is reached, thereby transforming a structure of material of the third portion into a martensitic structure.

In a further embodiment, the desired temperature is between 900° C. and 1400° C., preferably between 1000° C. and 1200° C., more preferably between 1050° C. and 1100° C.

In a further embodiment, the thickness of the third portion is 90 percent or less, preferably 75 percent or less, more preferably 50 percent or less of the thickness of the first portion or the second portion.

In a further embodiment, a hardening depth of the laser is between 0.1 mm and 0.4 mm, preferably between 0.2 mm and 0.3 mm.

In a further embodiment, a longitudinal dimension of the third portion is between 1 mm and 3 mm, preferably between 1.5 mm and 2 mm.

In a further embodiment, the third portion forms a groove on an outer surface of the sidewall.

In a further embodiment, the ferromagnetic material comprises steel.

Another embodiment provides a valve body for an electromechanically operable valve, comprising a circumferential sidewall enclosing a cavity extending along a longitudinal axis, wherein the sidewall comprises a first portion, a second portion, and a third portion the third portion is positioned between the first portion and the second portion in longitudinal direction, wherein the first portion, the second portion, and the third portion are made of a ferromagnetic material, wherein material of the third portion comprises a martensitic structure and a thickness of the third portion is smaller than a thickness of the first portion and the second portion.

In a further embodiment, a volume fraction of martensitic material in the third portion increases in radially outward direction.

In a further embodiment, the third portion forms a groove on an outer surface of the sidewall.

Another embodiment provides an electromechanically operable valve for an internal combustion engine, comprising a valve body as disclosed above, an electromagnetic actuator comprising an electromagnetic coil, arranged in a housing, and an armature, a valve needle, and a spring, the valve needle being movable in a reciprocating way by the electromagnetic actuator and the spring, wherein the valve needle, the spring, and the armature are positioned in the cavity of the valve body.

In a further embodiment, the third portion is positioned in an interior of the coil and encloses at least partially the armature.

BRIEF DESCRIPTION OF THE DRAWINGS

Example embodiments of the invention are described below with reference to the figures, in which.

DETAILED DESCRIPTION

Figure 1:
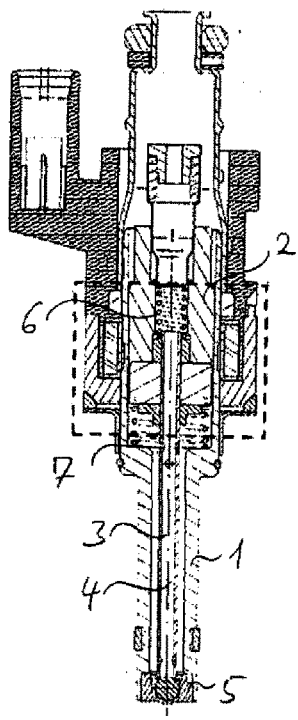
FIG. 1 shows an electromechanically operable valve for an internal combustion engine.

Embodiments of the present invention provide a method for producing a valve body, a valve body, and an electromechanically operable valve for an internal combustion engine which overcome the stated disadvantages, that is to say with which a mechanic flux bypass can be reduced while a mechanical strength of the valve body remains satisfactory or, preferably, unweakened.

A method for producing a valve body for an electromechanically operable valve is specified. The method comprises several steps.

In a first step a base element is provided wherein the base element itself comprises a circumferential sidewall having a first portion, a second portion, and a third portion. The base element, in particular the sidewall with the portions, is made of a ferromagnetic material. In the base element, a cavity is extending along a longitudinal valve axis and this cavity is enclosed by the sidewall of the base element, that is to say each of the portions encloses a section of said cavity. In longitudinal direction, i.e., along the longitudinal axis, is the third portion positioned between the first portion and the second portion. In particular, the first and second portions adjoin opposite axial ends of the third portion.

A thickness of the third portion is smaller than a thickness of the first portion and the second portion. The term "thickness" is to be understood as a distance between a surface of the portions facing the cavity, i.e. an inner surface of the sidewall, and another surface of the portion facing away from the cavity, i.e. an outer surface of the sidewall. The thickness of the first, second, and third portions is, thus, in particular the wall thickness of the sidewall in the respective portion. It is conceivable that the wall thickness of the sidewall in the first and/or second portion varies in the course along the longitudinal axis away from the third portion. In this case, the wall thickness of the first or second portions, respectively, is in particular understood to mean the wall thickness of the respective portion in an end region adjacent to the third portion.

In a subsequent step of the method, the third portion is hardened by laser heating, wherein the hardening is achieved by heating up the ferromagnetic material to a desired temperature and moving the laser across the third portion as soon as the desired temperature is reached. This leads to a transformation of an initial structure of the ferromagnetic material of the third portion into a martensitic structure, in particular by self-quenching. As soon as the laser beam moves away, the heated material cools very rapidly and the created martensitic structure remains.

In particular, the laser is operated to produce a laser spot which irradiates a section of the third portion for heating ferromagnetic material of said section to a predetermined temperature. Subsequently, the laser spot is moved to a further section of the third portion for heating ferromagnetic material of said further section to the predetermined temperature and for letting the material of the former section cool down again. Movement of the laser spot is repeated until the laser spot has scanned over the complete third portion.

It is conceivable that the sidewall is made from a material having a plurality of crystallites with different crystallographic structures. In this case, the volume fraction of crystallites having a martensitic structure is preferably larger in the third portion than in the first and second portions after the laser hardening step. For example, the volume fraction of martensitic crystallites in the third portion is at least twice as large as in the first and second portions.

By means of the locally decreased thickness of the ferromagnetic base element, a bottleneck for the magnetic flux is created and a magnetic flux bypass is reduced due to magnetic saturation and a minimized magnetic flux bypass is thereby created. On the other hand, a structural resistance of the valve body in the area of the third portion remains high due to the laser induced hardening. The structure of the first portion and of the second portion typically remain unaffected and are not treated by laser hardening. As a result of the partial laser hardening, an overall efficiency of a magnetic circuit in the valve body is improved as is an injector dynamic response while at the same time a resistance against fatigue remains high.

In one embodiment, the desired temperature, i.e. the predetermined temperature, is between 900° C. and 1400° C., preferably between 1000° C. and 1200° C., more preferably between 1050° C. and 1100° C. Typically, the laser beam heats the ferromagnetic material to a temperature just below the melting temperature so that a transformation of the structure is efficiently created.

A thickness of the third portion can be 90% or less, preferably 75% or less, more preferably 50% or less of the thickness of the first portion or the second portion. These values can be maximum values and allow for avoiding a bottleneck for the magnetic flux while the thickness itself is still big enough to resist even higher pressure values. Advantageously, the thickness of the third portion has a value in a range from 0.3 mm to 0.5 mm and the thickness of the first portion or the second portion has a value in a range from 0.6 mm to 1 mm, the limits being included in each case.

A hardening depth of the laser is typically smaller than the thickness of the third portion and can be in the range between 0.1 mm and 0.4 mm, preferably between 0.2 mm and 0.3 mm. This allows for an outer layer of the third portion to be efficiently hardened while a part of the third portion remains in its initial structure. Thus, a volume fraction of martensitic material in the third portion may increase—in stepped or continuous fashion—in radially outward direction.

A width of the third portion in longitudinal direction, i.e. a longitudinal dimension of the third portion, can be between 1 mm and 3 mm, preferably between 1.5 mm and 2 mm. In this way, a comparatively small portions needs to be treated by a laser beam while still avoiding the magnetic flux bypass. The hardened track itself, which was created by the laser hardening procedure, is, as a result, small in comparison to a length of the complete valve body.

In one embodiment, the third portion forms a groove in an outer surface of the sidewall. That is to say that the first portion, the second portion, and the third portion each comprise an outer surface turned away from the cavity and an inner surface facing the cavity, wherein the outer surface of the third portion is closer to the longitudinal axis than the outer surface of the first portion or the second portion. It is conceivable that the distance of the outer surface of the sidewall from the longitudinal axis in the first and/or second portion varies in the course along the longitudinal axis away from the third portion. In this case, the outer surface of the third portion being close to the longitudinal axis than the outer surface of the first or second portion is in particular understood to mean relate to the distance of the outer surface of the of the first or second portion in an end region adjacent to the third portion. Due to this feature, the cavity may have a smooth surface without any constrictions or bulges in the region of the third portion. In this way, a valve rod or a valve needle can easily be guided in the cavity, whereas on the outer surface, where no movable parts need to be attached, said surface includes a groove.

In one embodiment, the ferromagnetic material is a metal, in particular the ferromagnetic material comprises steel. Metals and specifically steel show high mechanical strength and their structure can be easily transformed by laser hardening.

A valve body for an electromechanically operable valve comprises a sidewall having a first portion, a second portion, and a third portion. The sidewall with the first, second and third portions extends circumferentially around a longitudinal axis so as to define a cavity extending in longitudinal direction from a fluid inlet end to a fluid outlet end, opposite the fluid inlet end, of the valve body. The third portion is positioned between the first portion and the second portion in longitudinal direction and in particular adjoins the first and second portion at opposite axial ends. The first portion, the second portion, and the third portion are made of a ferromagnetic material. The ferromagnetic material of the third portion comprises a martensitic structure or has a volume fraction having a martensitic structure as described previously. The martensitic structure is in particular created by laser hardening, preferably in order to avoid a magnetic flux bypass. A thickness of the third portion is smaller than a thickness of the first portion and the second portion, as described previously. This allows for a suppression of the magnetic flux bypass by a valve body with a high mechanical strength and pressure resistance.

The first portion, the second portion, and the third portion are advantageously fabricated from one single part. Such a one-piece structure increases the mechanical strength whereas a structure transformation by laser hardening can still be obtained.

The described valve body is typically fabricated by the method described above.

An electromechanically operable valve for an internal combustion engine comprises a valve body as already described, an electromagnetic actuator, a valve needle—sometimes also called a valve rod—and a spring. The electromagnetic actuator comprises an electromagnetic coil which is arranged in a housing. The housing and the coil may extend circumferentially around the sidewall. The actuator further comprises an armature which is mechanically coupled to the valve needle. The valve needle is attached to the spring and is movable in a reciprocating way in longitudinal direction. The movement is induced by the electromagnetic actuator and the spring. In particular the spring biases the valve needle towards a closing position. The actuator is operable to displace the valve needle axially away from the closing position against the bias of the spring by means of mechanical interaction of the valve needle with the armature. The valve needle, the spring, and the armature are positioned in the cavity of the valve body. With such an arrangement, the magnetic flux is guided through the valve in a desired way and the electromagnetic actuator as a source of a magnetic field and the magnetic flux connected to this magnetic field is guided inside the valve.

The coil of the electromagnetic actuator is typically a solenoid in order to create a homogenous magnetic field and a homogenous magnetic flux.

In one embodiment, the third portion is positioned in an interior of the coil, i.e. the coil and the third portion overlap axially. The third portion may enclose at least partially armature, i.e. the third portion axially overlaps the armature. In this way, the magnetic flux may be guided in an advantageous fashion through the valve body and the armature and the magnetic flux bypass is particularly small.

FIG. 1 shows a sectional view of an electromechanically operable fluid injection valve for an internal combustion engine. The fluid injection valve may be preferably configured for dosing fuel into a cylinder of the combustion engine. It may be provided for being received in a cylinder head of the combustion engine.

The electromechanically operable valve comprises an elongated valve body 1, an electromagnetic actuator 2, and a valve needle 3. The sectional view presented in FIG. 1 shows that the electromechanically operable valve is generally rotationally symmetric apart from parts depicted in the upper left corner of FIG. 1, these parts being provided in particular for supplying the valve with electrical power.

The valve body 1 extends along a longitudinal axis 4 from a fuel inlet end to a fuel outlet end. It has a central cavity which extends along the longitudinal axis 4 and takes in the valve needle 3. In the cavity, the valve needle 3 is axially guided and can be moved in a reciprocating way by the electromagnetic actuator 2. The cavity has a varying diameter starting from a small diameter at the fuel outlet end to a widened diameter in an upper part closer to the fuel inlet end. Components like springs 6, 7 or an armature 8 are received in the upper part of the cavity.

At the fuel outlet end of the valve body 1, a valve seat member 5 is positioned with one or several orifices in order to inject fuel from the injection valve into the combustion engine.

A first spring 6 is positioned in the cavity and coupled to the valve needle 3 with one end and with the valve body with an axially opposite end. The first spring 6 biases the valve needle 3 towards a closing position in which the valve needle 3 may contact the seat plate 5.

The electromagnetic actuator 2 comprises a coil 9 in solenoid shape which can create an electromagnetic field 11 and an armature 8 which is axially moved within the cavity by this electromagnetic field 11. The valve needle 3 is mechanically coupled to the armature 8 so that the armature 8 is operable to take the valve needle 3 with it when the armature 8 is displaced by the electromagnetic field 11 of the coil 9. In this way, the electromagnetic actuator 2 is operable to displace the valve needle 3 away from the closing position against the bias of the first spring 6.

A second spring 7 positioned below the armature 8, i.e. between the armature 8 and the fuel outlet end of the valve body. The second spring 7 may be operable to dampen a movement of the armature 8 when the valve needle 3 reaches the closing position after the actuator 2 has been de-energized.

The electromagnetic coil 9 is arranged in a housing surrounding the valve body 1. The valve needle 3, the first spring 6, the second spring 7, and the armature 8 are positioned in the cavity of the valve body 1. The valve body 1 is made of steel having the steel grade 415 which is a ferromagnetic metal. In further exemplary embodiment, the valve body 1 can be made of steel having the steel grade 416 or the steel grade 630 as well.

Figure 2:
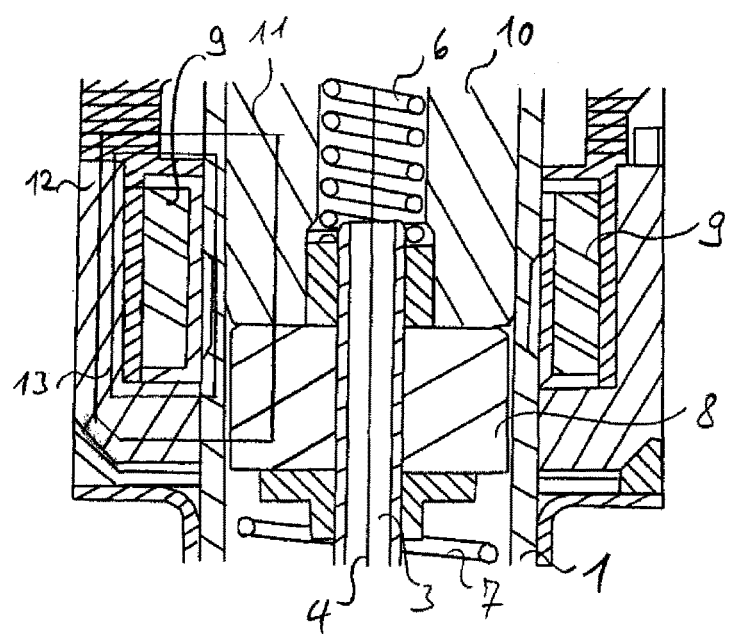
FIG. 2 shows an enlarged view of a middle part of the valve in a sectional view.

A middle section of the valve shown in FIG. 1 is shown in FIG. 2 in an enlarged view.

As shown in FIG. 2, the coil 9 is positioned outside the valve body 1 and creates a first magnetic flux 11 which is shown exemplarily only for a left half of the coil 9. This magnetic flux 11 encircles the coil 9 and goes as a primary magnetic path through a magnetic circuit comprising the armature 8, a pole piece 10 and the housing 12. As a secondary magnetic path, a magnetic flux bypass 13 goes through the valve body 1 and the housing 12—but not through the armature 8 and the pole piece 10—and encircles the coil 9 as well.

Figure 3:
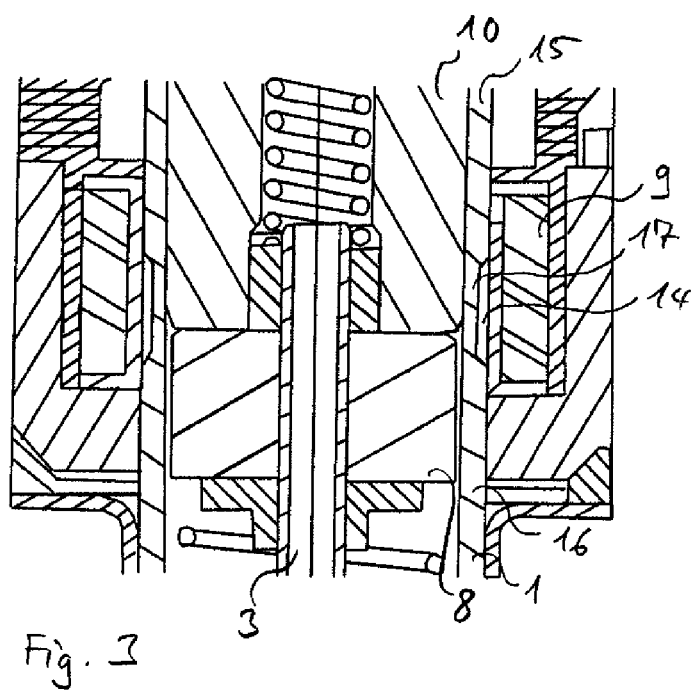
FIG. 3 shows the sectional view according to FIG. 2 without the magnetic flux lines.

In FIG. 3, the middle part of the valve shown in FIG. 1 is shown corresponding to FIG. 2 but without the magnetic flux 11 and the magnetic flux bypass 13.

In order to minimize the magnetic flux bypass 13, the sidewall of the valve body 1 has a third portion 17 which is positioned between a first portion 15 and a second portion 16 of the sidewall of the valve body 1. The sidewall extends circumferentially around the longitudinal axis 4 so as to define the cavity of the valve body 1.

The first portion 15 is positioned above the third portion 17 and the second portion 16 is positioned below the third portion 17. Specifically, the first portion 15 of the sidewall adjoins the third portion 17 of the sidewall in longitudinal direction 4 towards the fuel inlet end and the second portion 16 of the sidewall adjoins the third portion 17 of the sidewall in longitudinal direction 4 towards the fuel outlet end. A groove 14 is defined in an outer surface of the sidewall by means of the third portion 17.

The third portion 17 is positioned between the coil 9 and the pole piece 10 in horizontal direction as well as between the armature 8 and the coil 9. In other words, the third portion 17, the pole piece 10, the armature 8 and the coil 9 overlap axially. The third portion 17 is positioned in an interior of the coil 9 and encloses at least partially the valve needle 3 which is guided in the cavity of the valve body 1 and in an opening of the armature 8. The armature 8 is positioned below the pole piece 10. The armature 8 may be configured to come in direct contact with the pole piece 10 when the actuator 2 is energized. The pole piece 10 is in direct contact with the valve body 1 and positionally fixed with respect to the valve body 1, whereas the armature 8 is separated from the valve body 1 by a small gap and longitudinally displaceable in the cavity in reciprocating fashion with respect to the valve body 1.

The thickness of the first portion 15, in a region axially adjacent to the third portion 17, is equal to a thickness of the second portion 16 in a region axially adjacent to the third portion 17 and is 1 mm, whereas the thickness of the third portion 17 is only 0.5 mm. In further embodiments, the thickness of the third portion 17 can also be increased up to 90% of the thickness of the first and second portions 15, 16. It is also possible that the first portion 15 and the second portion 16 have different thicknesses.

The groove 14 is positioned on a side of the valve body 1 facing the coil 9 and being turned away from the cavity. An outer surface of the first portion 15, the second portion 16, and the third portion 17 is turned away from the cavity as well, but a distance between the outer surface of the third portion 17 and the cavity is smaller than a distance between the outer surface of the first portion 15 or the second portion 16 and the cavity.

The valve body 1 is produced as one single piece part in order to enhance the mechanical strength. The production of the valve body 1 starts with a base element with or without the groove 14. In case that the groove 14 is initially not present in the base element, this groove 14 has to be applied by forging or any other suitable method. The width of the groove 14, which is identical to the distance between the first portion 15 and the second portion 16 in longitudinal direction, is in the exemplary embodiment shown in FIG. 3 3 mm. In further embodiments, even smaller values up to 1 mm only are possible. The third portion 17 is a hardened track of the finished valve body 1 after manufacturing according to the present disclosure.

In a non-hardened valve body, the groove 14 on the ferromagnetic valve body 1 would worsen a structural resistance. A wall thickness may not be high enough to resist a maximum tension that occurs at the inner surface of the sidewall when a fluid pressure reaches a critical value. The price to be paid for increase of magnetic efficiency due to the groove 14 in a non-hardened valve body is the inability for the injector to be operated at high fluid pressures. Typical high pressures are in the range of at least 300 bar but may even reach 500 bar.

Embodiments of the present invention make use of the idea to provide the third portion 17 as a laser hardened groove 14 in order to obtain a comparable structure resistance that would be present in a valve body 1 without groove 14—so that the valve body 1 is suitable for operation with such high pressures—and at the same time has the advantage related to a bottleneck that minimizes unwanted magnetic flux bypass 13.

The hardening of only the third structure 17 is achieved by a hardness increase which arises through martensitic transformation of a micro structure of the material of the valve body 1. Martensite is a very hard metal structure and the transformation into martensite improves the mechanical strength of the material which is only possible in the shown exemplary embodiment with martensitic steel. Since only the third region 17 is hardened, the risk of impairing the magnetic properties of the sidewall in the region of the first and second portions 15, 16 by the martensitic transformation is particularly small.

In order to harden a work piece forming a base element of the later valve body 1, a laser beam spot warms the metal just under the melting temperature, i.e. in the exemplary embodiment shown in FIG. 3 to a temperature of 1100° C. Once this temperature has been reached at one position within the third region 17, the laser beam spot is moved across the area of the third portion 17 (for example by reciprocating in a sinusoidal way) while the base element is rotated. The laser beam continuously heats the surface in a processing direction and the high temperature applied to the material causes iron atoms to change their position within the metal lattice, a process which is also known as austenization. As soon as the laser beam moves away, a hot layer is cooled very rapidly by surrounding material in a process known as self-quenching. Rapid cooling prevents the metal lattice from returning to its original structure and, thus, producing martensite. In addition, compressive stresses are generated in the hardened layer. The cooling is carried out by air surrounding the heated valve body 1 but additional coolants can be applied in other exemplary embodiments. A hardening depth of the laser is in the exemplary embodiment shown on FIG. 3 0.4 mm, in further embodiments can the hardened depths even be lower. With an at least partially laser-hardened valve body 1 with the groove 14, i. e., a valve body 1 showing the same structural resistance that would be present in a valve body without a groove, it is possible to take advantage of the bottle neck that stops the unwanted magnetic flux bypass The invention is not limited to specific embodiments by the description on the basis of said exemplary embodiments but comprises any combination of elements of different embodiments. Moreover, the invention comprises any combination of claims and any combination of features disclosed by the claims.

What is claimed is:

1. A method for producing an electromechanically operable valve, the method comprising:
  a) providing a base element with a circumferential side wall made of a ferromagnetic material and enclosing a cavity extending along a longitudinal axis, wherein the sidewall has a first portion, a second portion, and a third portion, the third portion being positioned in a longitudinal direction between the first portion and the second portion, wherein a thickness of the third portion is smaller than a thickness of the first portion and a thickness of the second portion; and
  b) hardening the third portion by laser heating, wherein the ferromagnetic material is warmed up to a desired temperature and the laser is moved across the third portion once a target temperature is reached, thereby transforming a structure of material of the third portion into a martensitic structure; and c) fixing a pole piece inside the cavity so that the third portion of the sidewall and the pole piece overlap axially in part, but not completely.

2. The method of claim 1, wherein the target temperature is between 900° C. and 1400° C.

3. The method of claim 1, wherein the thickness of the third portion is less than or equal to 90 percent of the thickness of the first portion or the second portion.

4. The method of claim 1, wherein a hardening depth of the laser is between 0.1 mm and 0.4 mm.

5. The method of claim 1, wherein a longitudinal dimension of the third portion is between 1 mm and 3 mm.

6. The method of claim 1, wherein the third portion forms a groove on an outer surface of the sidewall.

7. The method of claim 1, wherein the ferromagnetic material comprises steel.

8. The method of claim 1, wherein the thickness of the third portion is less than or equal to 90 percent of the thickness of the first portion or the second portion.

* * * * *